Oct. 5, 1937.  J. E. LOVELY ET AL  2,094,993
LATHE
Filed Jan. 29, 1935  12 Sheets-Sheet 6
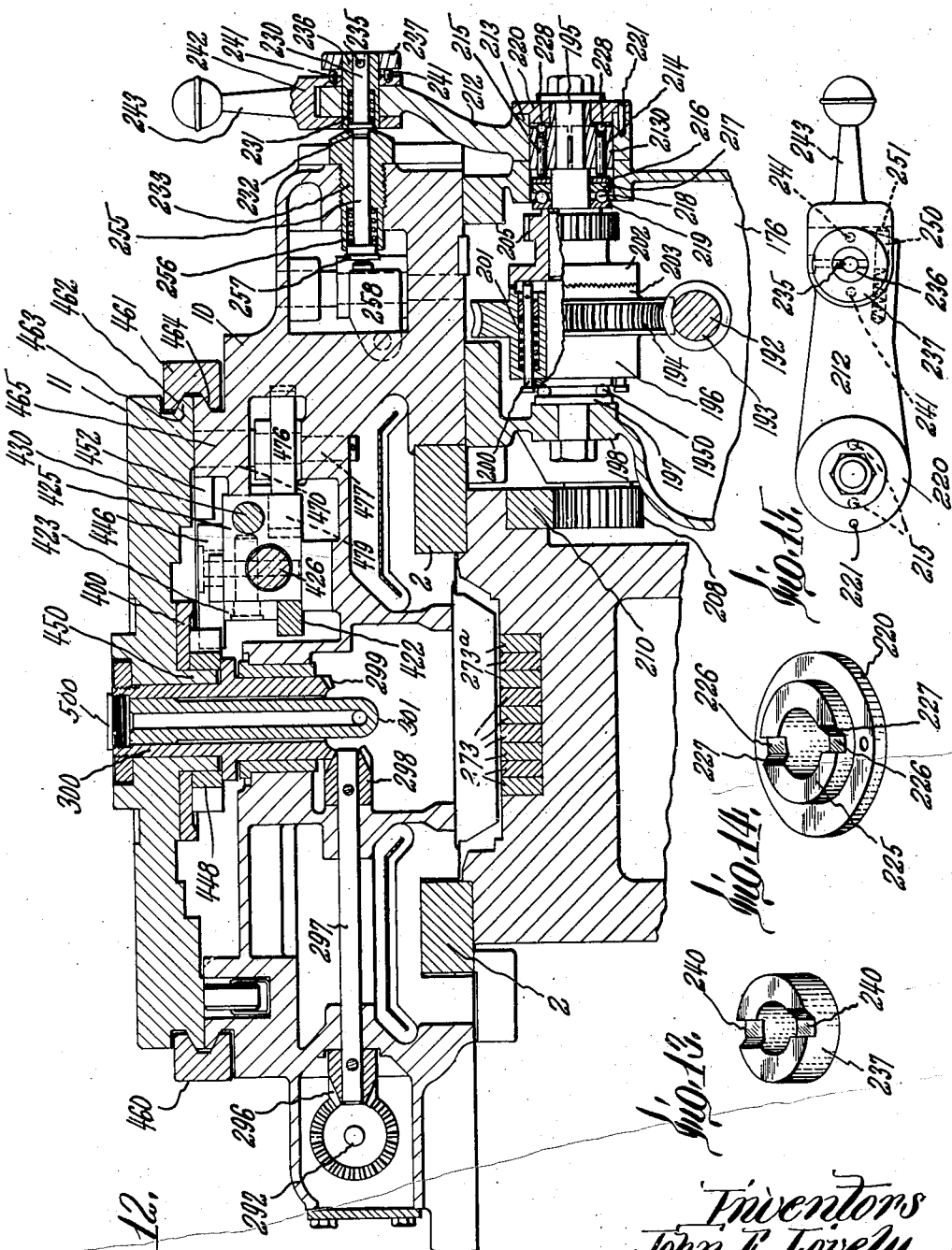

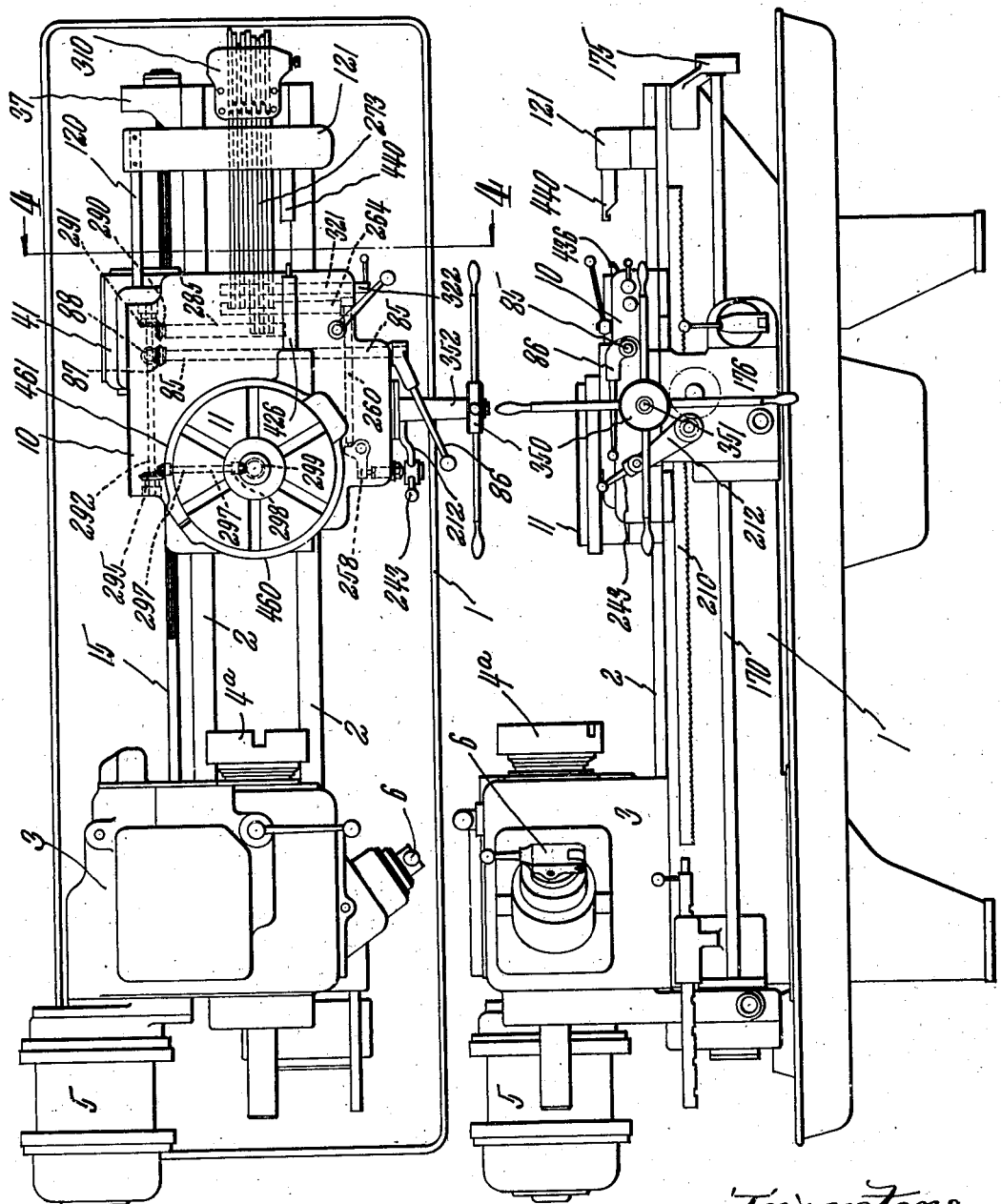

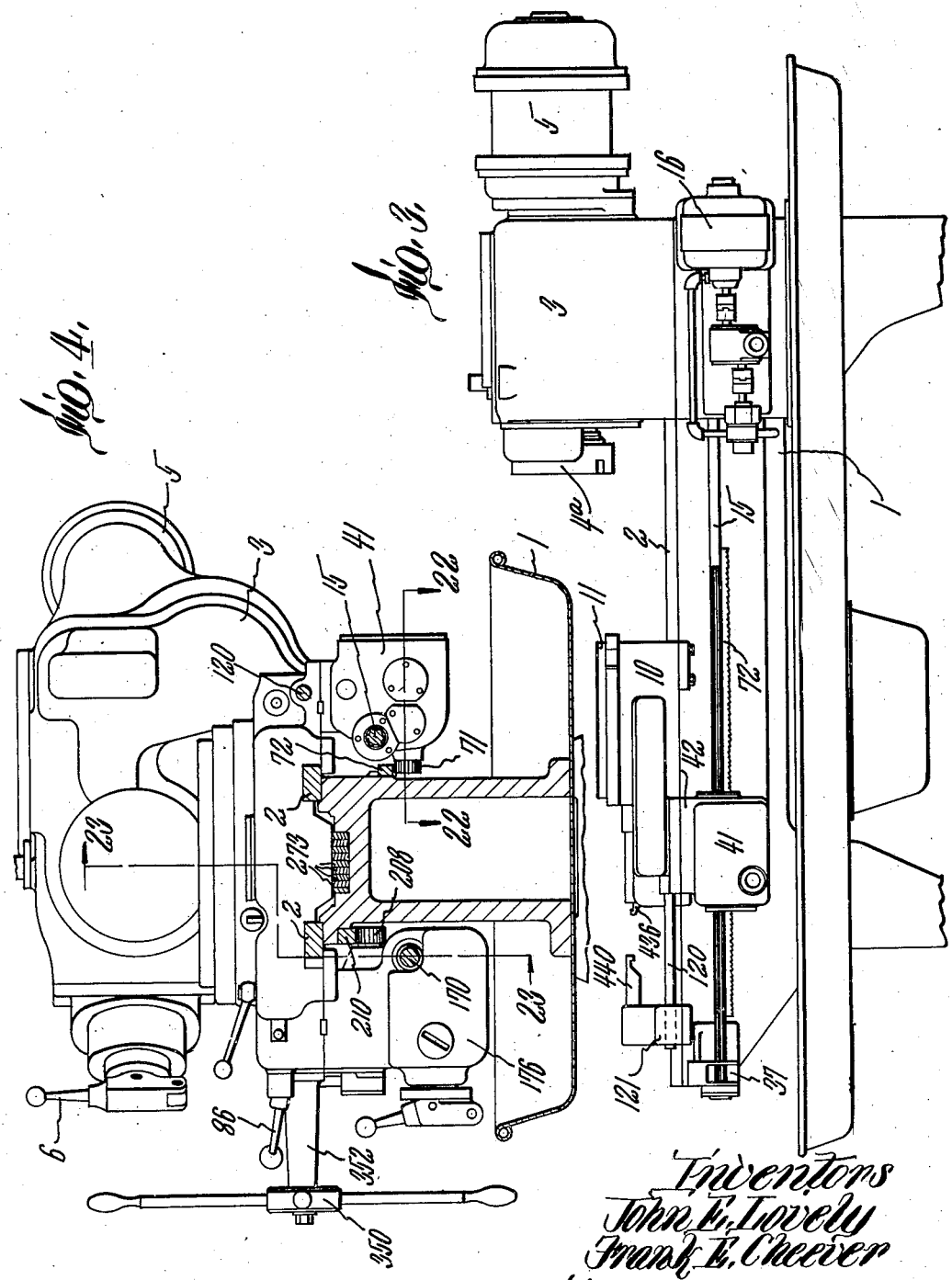

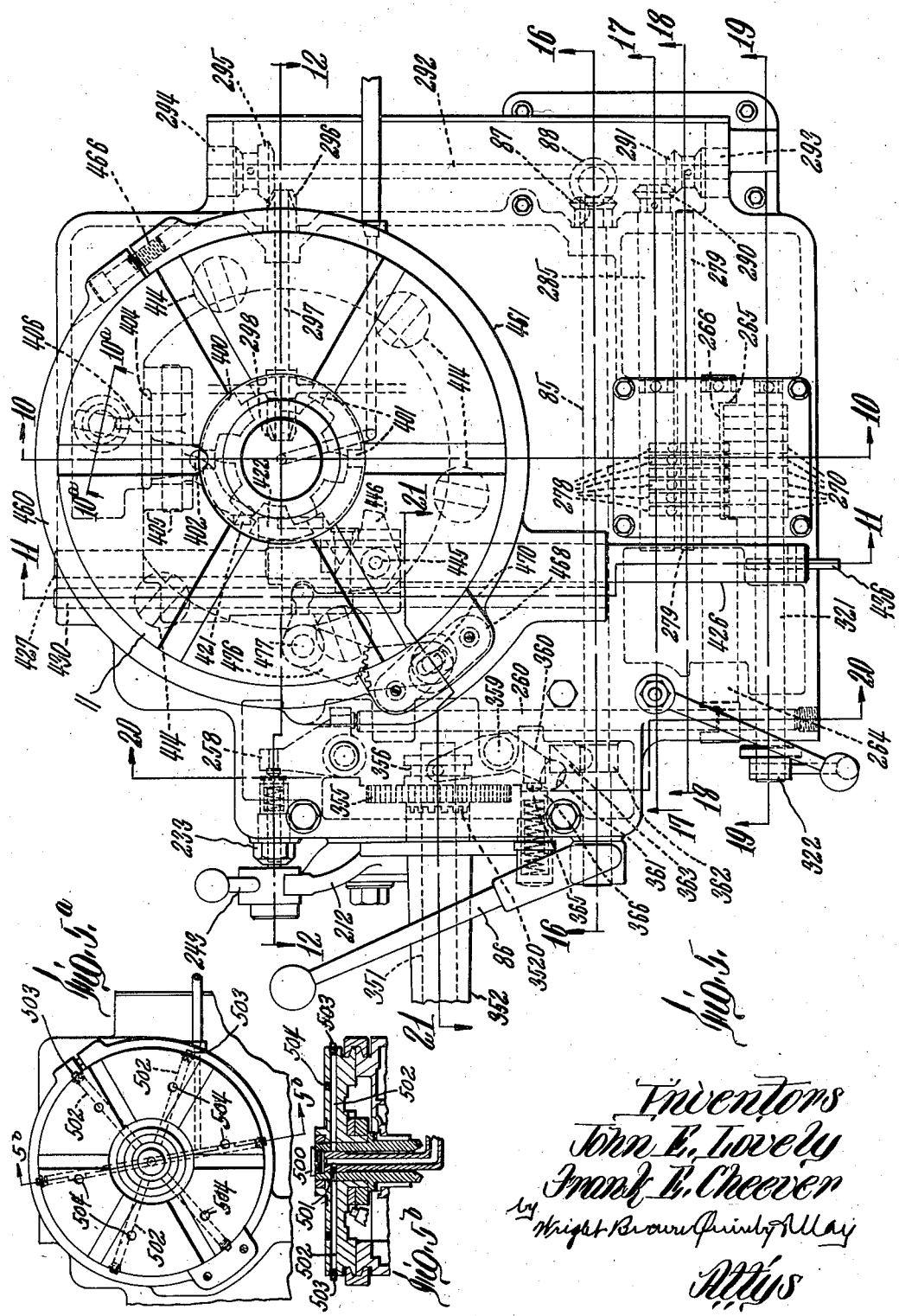

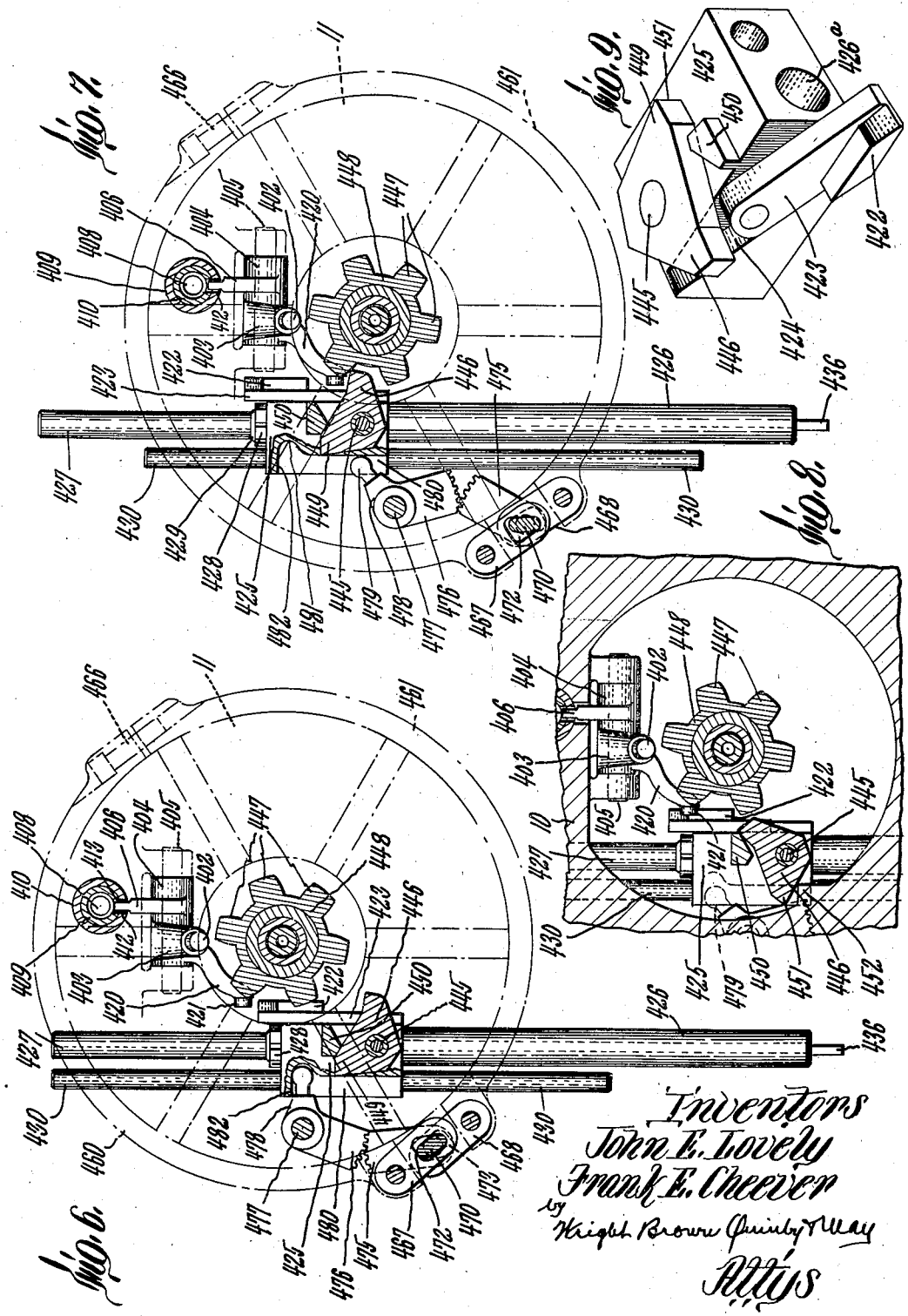

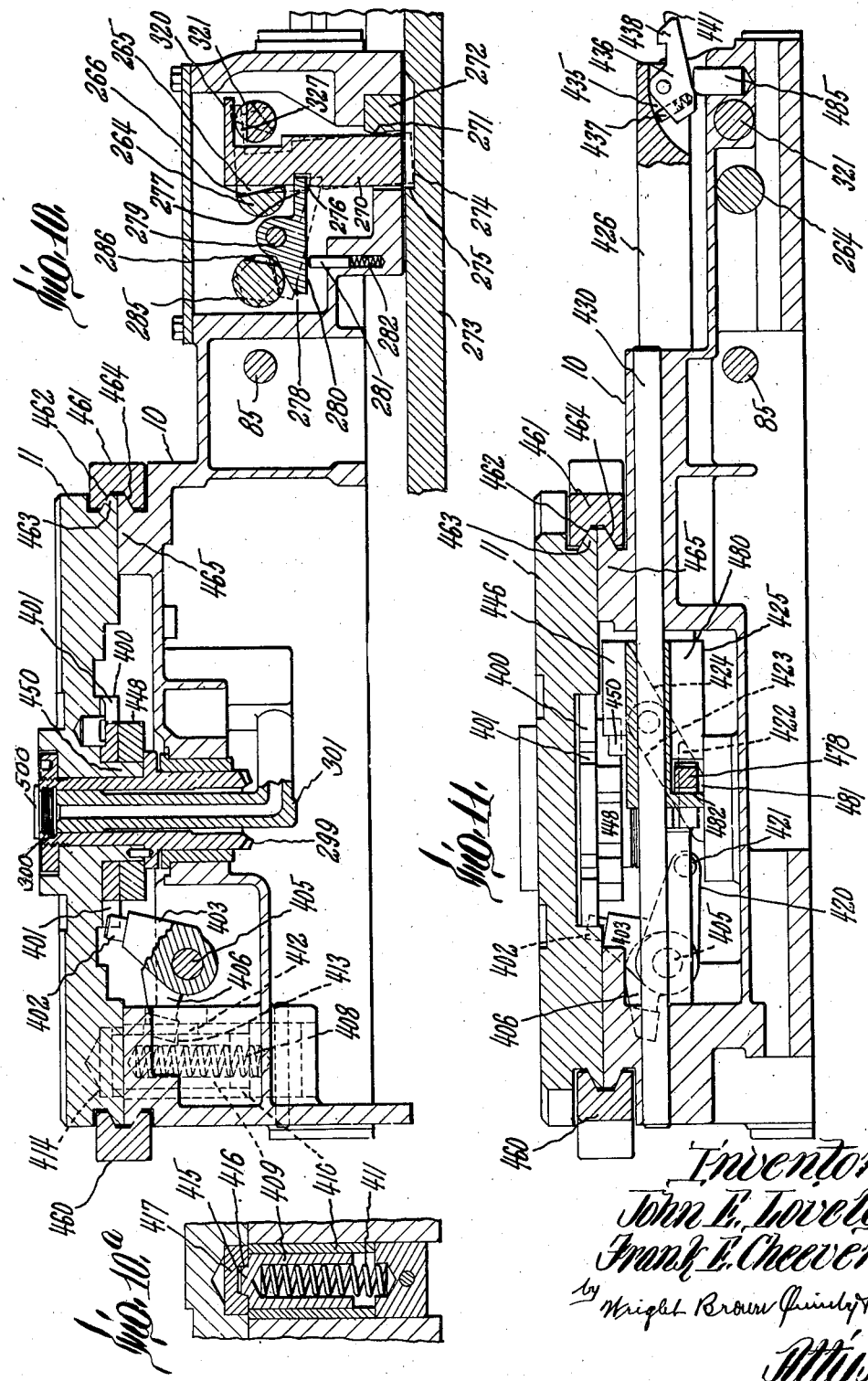

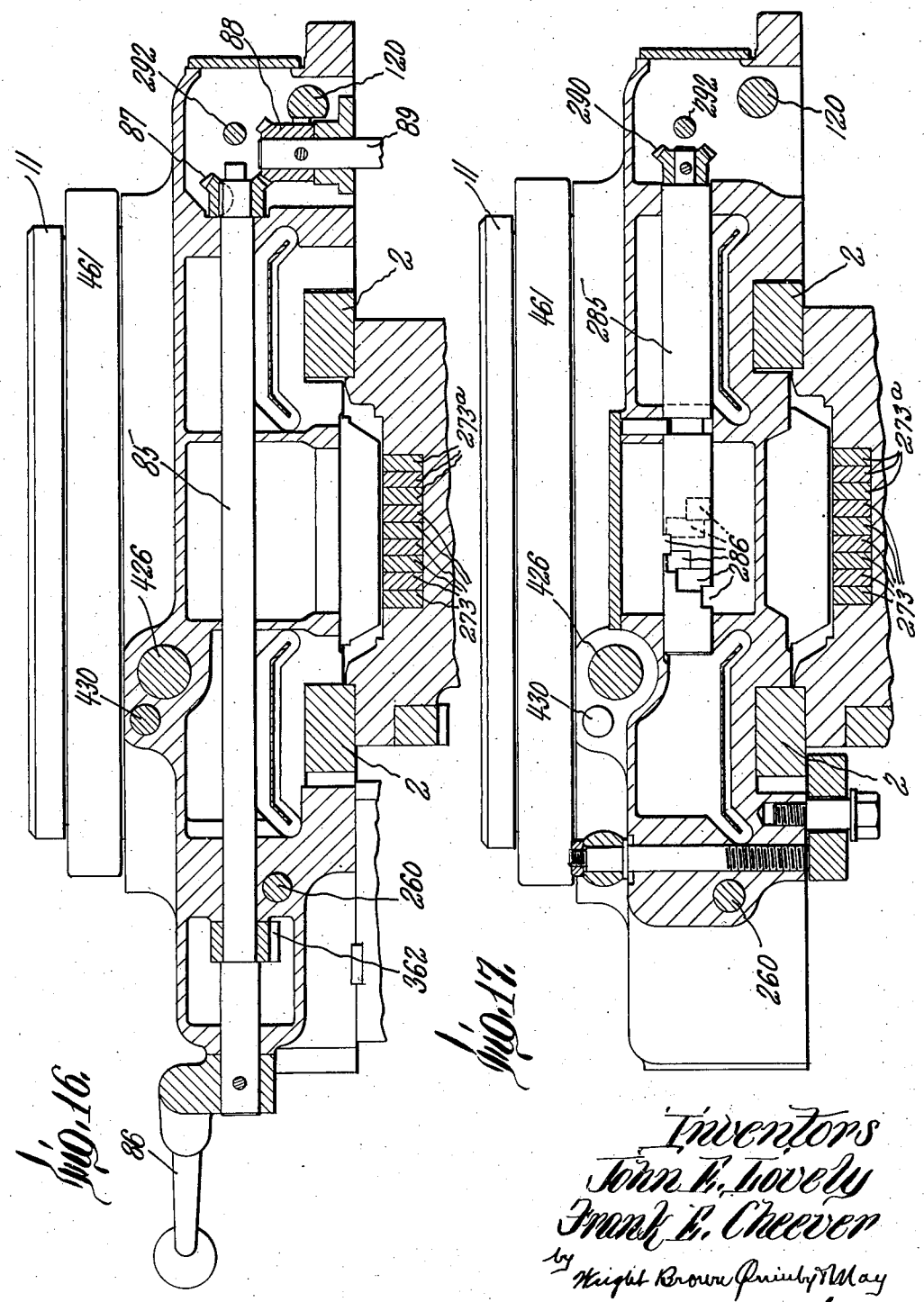

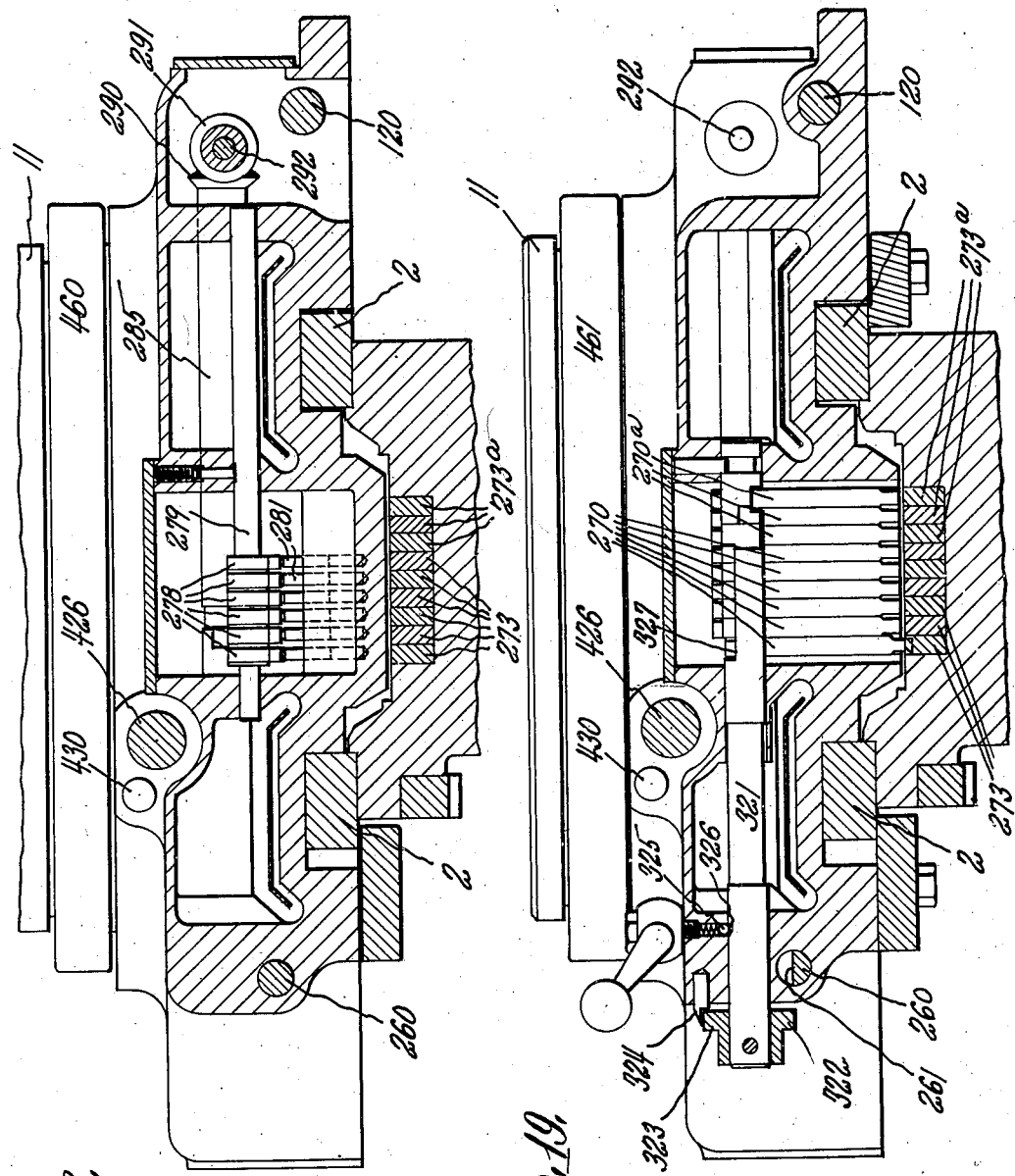

Oct. 5, 1937. J. E. LOVELY ET AL 2,094,993
LATHE
Filed Jan. 29, 1935 12 Sheets-Sheet 9
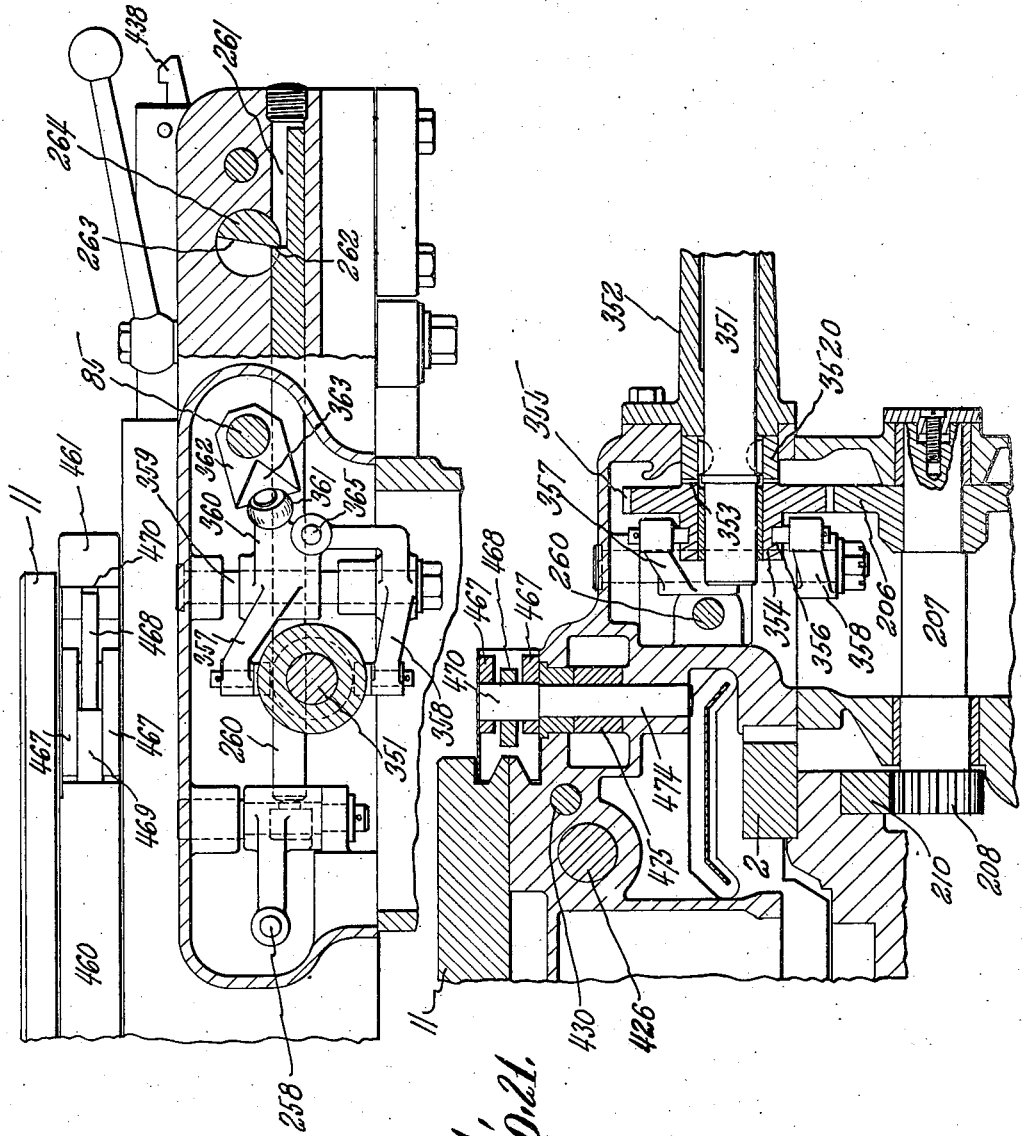

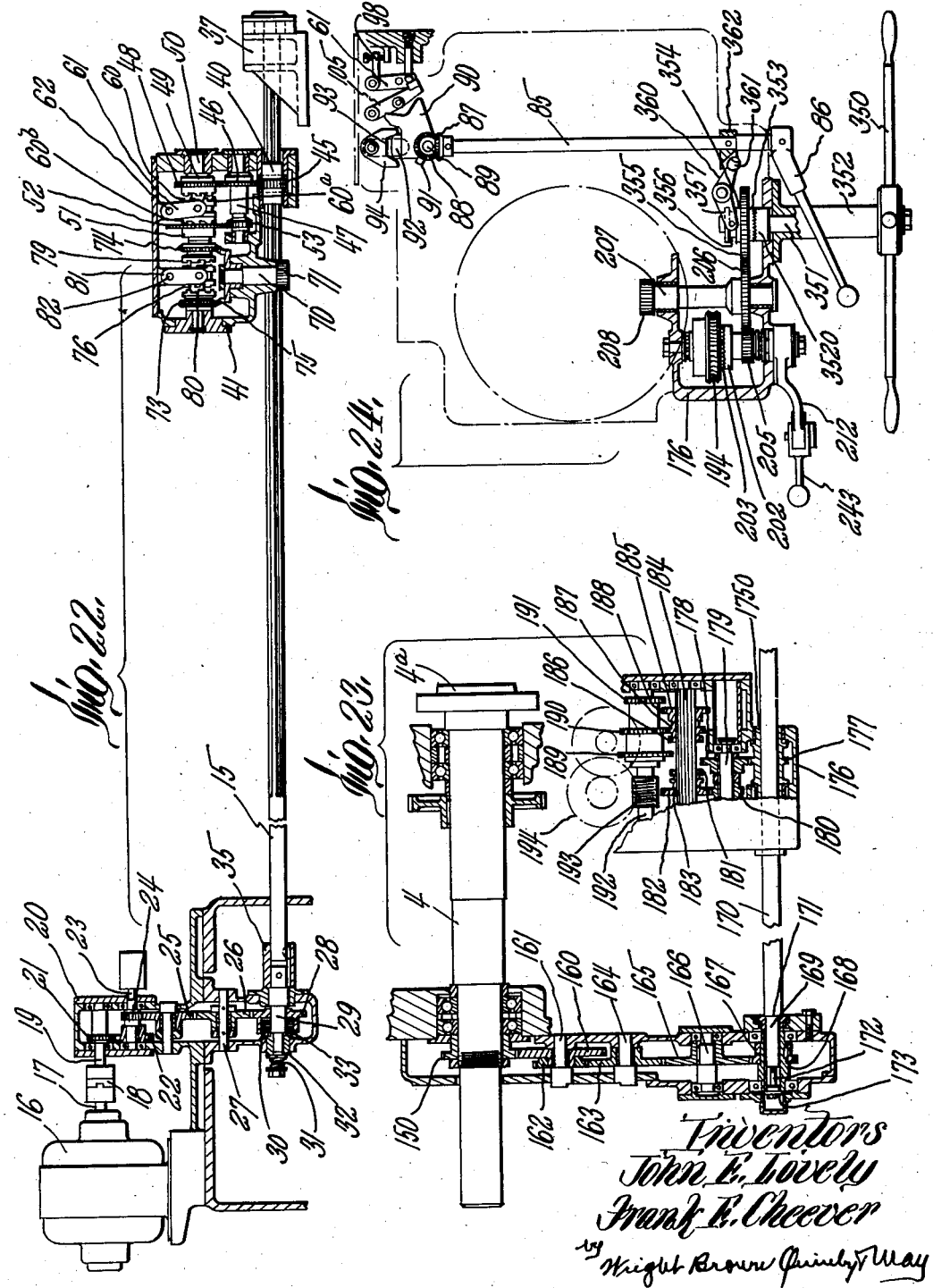

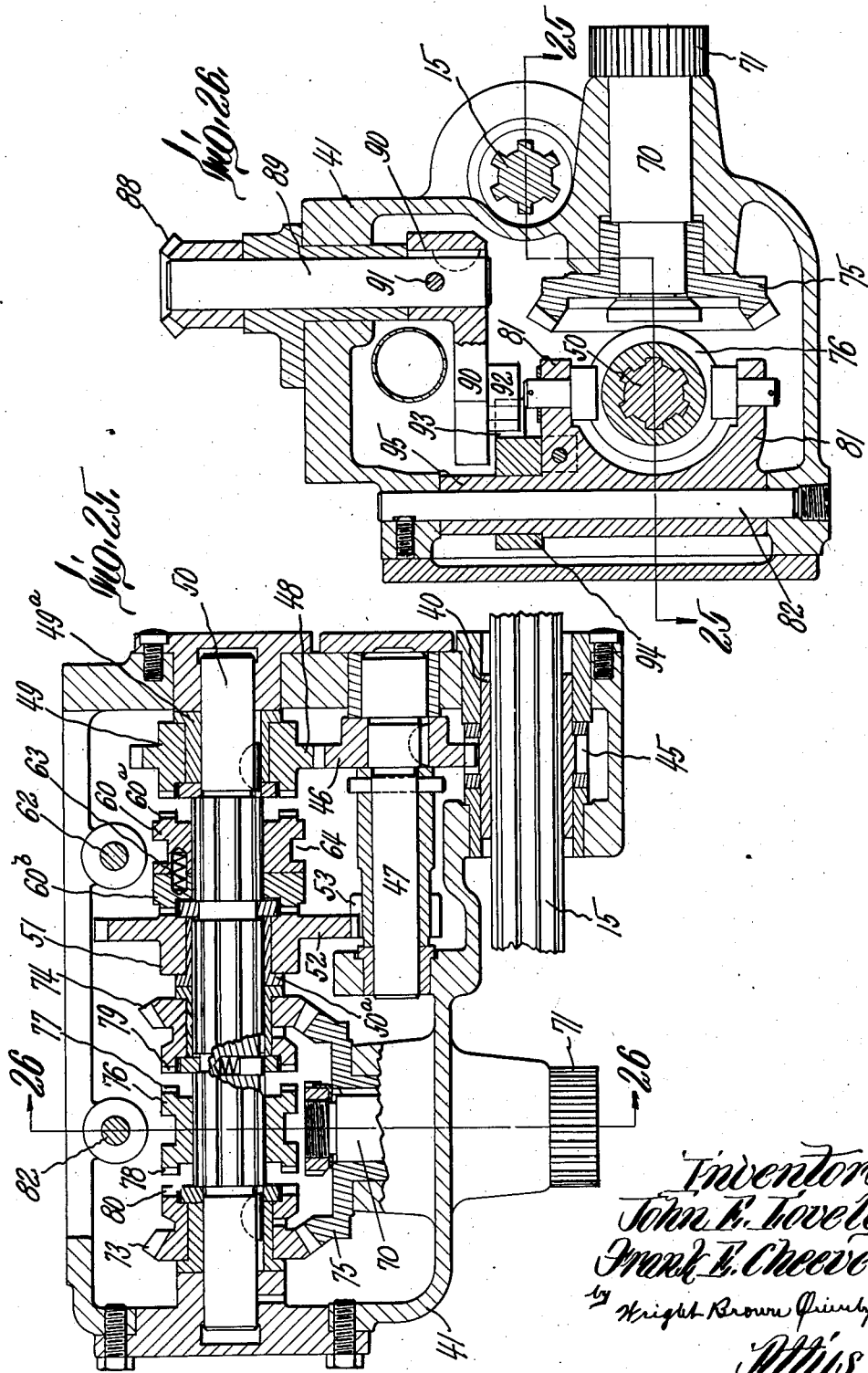

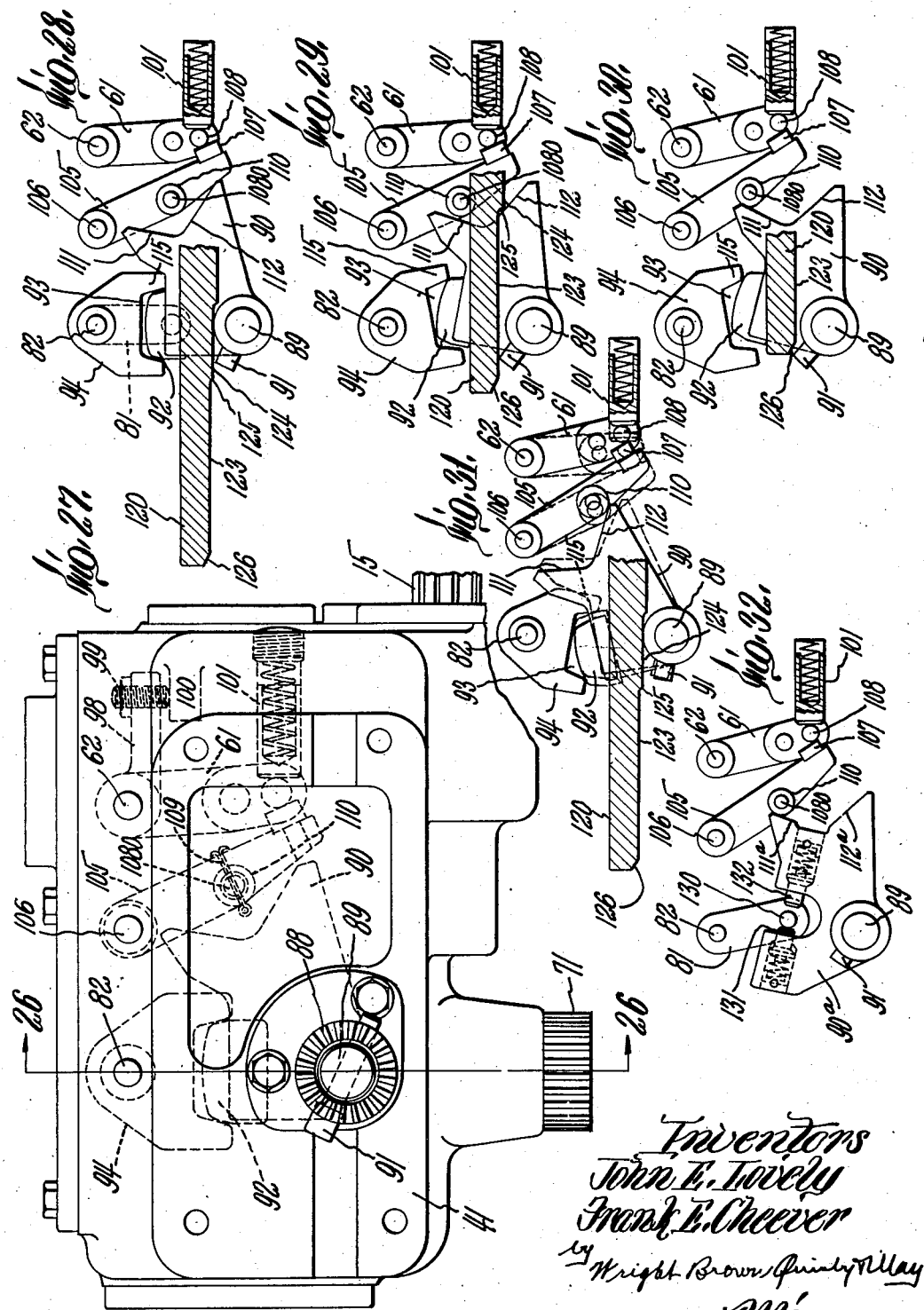

Patented Oct. 5, 1937

2,094,993

UNITED STATES PATENT OFFICE 2,094,993

LATHE

John E. Lovely and Frank E. Cheever, Springfield, Vt., assignors to Jones & Lamson Machine Company, Springfield, Vt., a corporation of Vermont Application January 29, 1935, Serial No. 3,914

29 Claims. (Cl. 29—46)

This invention relates to lathes, and more particularly to lathes of the type provided with tool carriages movable in the direction of the rotational axis of the work from and toward a face of the work. Such a tool carriage commonly carries a plurality of tools in a turret which may be indexed to bring any selected tool into operative angular position.

More particularly this invention relates to the actuation and control of the carriage, and when the carriage is a turret saddle, it also relates to the turret-indexing and locking mechanism.

One object of this invention is to provide for power traverse of the carriage or saddle at any of a plurality of selected speeds and automatically at a relatively low speed as it approaches its rear limit of motion.

A further object, when a turret is employed, is to provide an improved mechanism for automatically indexing the turret adjacent to the outer or rear end of the traverse.

A still further object is to provide improved turret mechanism which is automatically operated to clamp the turret rigidly to the saddle after it has started its forward motion.

A further object is to provide automatic disconnection of the usual saddle traverse hand wheel when certain power mechanism is in operation.

Further objects and advantageous constructions will appear from a more complete description of an embodiment of this invention disclosed in the accompanying drawings in which Figures 1 and 2 are a top plan and a front elevation, respectively, of a turret lathe embodying this invention.

Figure 3 is a fragmentary rear elevation of the same machine.

Figure 4 is a section to a larger scale on line 4—4 of Figure 1.

Figure 5 is a top plan to a larger scale of the turret saddle, certain parts being shown in dotted lines.

Figure 5a is a fragmentary top plan to a smaller scale than Figure 5 showing the turret table, the coolant passages therein being shown by dotted lines.

Figure 5b is a detail section on the line 5b—5b of Figure 5a.

Figures 6 and 7 are views similar to a portion of Figure 5, but with parts removed or in section and showing parts in turret-clamped and unclamped positions, respectively.

Figure 8 is a view somewhat similar to Figures 6 and 7, but showing a portion of the saddle and its action on the indexing pawl.

Figure 9 is a perspective of a portion of the indexing mechanism.

Figures 10 to 12 and 16 to 21, inclusive, are detail sections on the correspondingly numbered section lines of Figure 5.

Figures 13 and 14 are perspectives of certain cam elements of a knock-off mechanism.

Figure 15 is a plan of a handle member shown in section in Figure 10.

Figure 22 is a somewhat diagrammatic horizontal section of the turret saddle high speed traverse mechanism on line 22—22 of Figure 4.

Figure 23 is a somewhat diagrammatic vertical section of the low speed turret saddle traverse mechanism on line 23—23 of Figure 4.

Figure 24 is a detail view partly in plan and partly in section showing the control mechanism for the high and low speed and hand-operated turret traverse mechanisms.

Figure 25 is a section on line 25—25 of Figure 26 through the high speed traverse gear box.

Figure 26 is a section on line 26—26 of Figures 25 and 27.

Figure 27 is a top plan of the same.

Figures 28 to 31, inclusive, are detail views showing the clutch-actuating mechanism in different positions.

Figure 32 is a view similar to Figure 28, but showing a modification.

Referring first to Figures 1 and 2, at 1 is indicated somewhat conventionally the bed of a flat turret lathe having the usual ways 2. At 3 is shown the lathe headstock having a rotary spindle 4 (Figure 23) to which may be secured the work-holding chuck 4a. At 5 is indicated a motor carried by the headstock and arranged through suitable gearing, not material to the present invention, to drive the spindle 4 at any selected of a plurality of speeds, these speeds being selectable by manipulation of a suitable control handle 6 (see Figures 1, 2 and 4). At 10 is shown a carriage traversable along the ways 2 toward and from the headstock. As shown this carriage 10 is a turret saddle which may support a rotary turret, the base plate of which is indicated at 11 in various figures of the drawings.

*Saddle traversing mechanism—High speed*

The turret saddle is arranged to traverse toward and from the headstock by either of two drive mechanisms. One of these includes a high speed drive shaft 15, which, as shown, is arranged somewhat to the rear of the ways 2 and extends along the length of these ways. As shown best in Figure 22, this shaft 15 is driven from a motor 16 secured to the back of the machine bed. This motor 16 has its armature shaft 17 connected through a coupling 18 to a shaft 19 journaled in a gear casing 20. This gear casing contains a train of reduction gearing as follows: the shaft 19 carries a gear 21 meshing with a gear 22 on a shaft 23; a pinion 24 on the shaft 23 meshes with a gear 25, which in turn, meshes with a gear 26 journaled on a shaft 27; the gear 26 in turn meshes with a gear 28 journaled on a stub shaft 29 and normally connected to rotate this shaft 29 by means of a friction slip clutch 30 which may slip under abnormal conditions to prevent damage to the other parts. The frictional pressure of this clutch may be adjusted by adjustment of a spring 31 which bears on a sleeve 32 engaging a pressure ring 33 of the clutch. The shaft 29 is connected through a coupling 35 to the headstock end of the shaft 15. The other end of the shaft 15 is journaled in a suitable bearing bracket 37 secured to the machine bed. The shaft 15 is splined for the major portion of its length and slidable on this portion of the shaft is a correspondingly internally splined sleeve 40, mounted for rotation, but held against axial movement in a gear casing 41 carried by or forming a part of the back apron 42 of the turret saddle. As shown best in Figures 22 and 25, this sleeve 40 carries a gear 45, which meshes with a gear 46 on a shaft 47. The gear 46 meshes with a gear 48 on the clutch collar 49 journaled on a sleeve 49a keyed to a shaft 50. Also journaled on a sleeve 50a splined on the shaft 50 is a similar clutch collar 51 which carries a gear 52 larger than the gear 48. This gear 52 meshes with a pinion 53 also secured to the shaft 47. The shaft 50 has keyed thereto a double clutch element 60, which may be shifted into clutching engagement with either selected collar 49 or 51 by means of a shifter arm 61 journaled on a shaft 62. In order that there shall be no disconnection of the drive of the shaft 50 by the throwing of the clutch 60, this clutch 60 is made in two parts 60a and 60b, which are spring pressed apart as by springs such as 63, and the shift arm 61 engages in a peripheral groove 64 in the clutch part 60a, which faces the more rapidly driven collar 49. The mating clutch faces of the elements 51 and 60b are formed straight on one side and inclined on the other, as shown in Figure 22, so that when the clutch element 60a is brought into clutching engagement with the collar 49 and becomes driven thereby, the clutch element 60b may overrun the low speed clutch collar 51, but as soon as the portion 60a is moved out of driving engagement with the clutch collar 49, the clutch collar 60b immediately becomes effective. Thus the shaft 50 is driven at either of two selected speeds from the shaft 15.

The shaft 50 has a reversing mechanism connection to a shaft 70 which extends out from the gear casing 41 and has fixed to its inner end a pinion 71 which meshes with a rack bar 72 (see Figures 3 and 4) fixed to the rear wall of the bed 1. This reversing connection consists of the bevel gears 73 and 74, rotatable on the shaft 50 and both meshing with a bevel gear 75 carried by the shaft 70. Either selected gear 73 or 74 may be driven from the shaft 50 by means of the double clutch collar 76 splined to the shaft 50, and having oppositely disposed clutch faces 77 and 78 cooperating selectively with clutch faces 79 and 80 on the gears 74 and 73. The clutch collar 76 may be shifted from one to the other of its positions by means of a shifter arm 81 (see Figure 22) journaled on a shaft 82.

This drive mechanism, driven from the rapid traverse shaft 15, is arranged to be controlled, for the most part manually, from the forward face of the machine. Mechanism for accomplishing this is shown best in Figures 16, 24, and 27 to 32. A shaft 85, which extends from front to back of the machine and is suitably journaled in the saddle 10, carries on its forward end a hand-controlling lever 86. At its rear end it has fixed thereto a beveled gear 87 which meshes with a similar gear 88 (see Figures 16, 24 and 26) fixed to a vertical shaft 89 which extends down into the gear casing 41. This shaft 89 has suitably secured thereto, as by a key, a dog 90 which is positioned within the casing 41 and it is also provided with a laterally projecting pin 91. The dog 90 is provided with a block 92 which extends within a notch 93 in a rocker member 94, which is secured to a hub portion 95 of the shifter arm 81 which controls the reverse drive clutch collar 76. Thus by rocking hand lever 86, the dog 90 may be rocked so as to shift the clutch collar 76 so as to connect either the gear 73, or the gear 74 into driving relation to the rack pinion 71. When the gear 73 is in driving relation, the parts are connected to drive the saddle toward the headstock, and when the gear 74 is in driving relation, the turret saddle is connected to be moved away from the headstock.

Carried by the arm 61 by which the speed control clutch 60 is actuated is an extension 98 (Figure 27) which carries at its end an abutment screw 99, which may bear against a stop lug 100 formed as a part of the gear casing 41, this acting to limit the motion of the clutch collar 60 away from the gear sleeve 49 so as to bring the clutch collar element 60b into clutching engagement with the slow speed gear collar 51. This arm is normally held in this position as by means of a spring pressed abutment 101 so that the clutch 60 is normally held in low speed driving relation. It may, however, be moved into high speed relation by the action of a lever 105, which is journaled on the pivot 106 between the shift arms 61 and 81. As shown this lever 105 is provided at its free end with a shoe 107, which may bear against a pin 108 secured to the arm 61. The abutment 101 bears on the opposite side of this pin 108. Intermediate its length, this arm 105 has journaled on a pin 108a, secured thereto as by a cotter 109 (see Figure 27), a roll 110. This roll 110 is positioned to be engaged at suitable times by cam faces 111 and 112 on the dog 90. Figure 28 shows these parts in neutral position where the clutch 76 is out of engagement with both of the gears 73 and 74. By lifting the handle 86 from the neutral angular position, the dog 90 is rocked into the position shown in Figure 29, in which the cam element 94 is rocked to bring the clutch collar 76 into driving relation with the reverse gear 74 thus to move the turret saddle away from the headstock, and in this position of the parts the shift lever 61 is in its spring pressed position, connecting the clutch element 60b into driven relation with the low speed gear 52. In this position of the parts the turret saddle will thus be moved away from the headstock at the lower of the two speeds at which it may be driven by rotation of the high speed drive shaft 15.

On further upward motion of the hand lever 86 the parts will be moved to the position shown in Figure 30. In this position the block 92 is riding on the projection 115 of the cam piece 94, which, however, fails to move this cam piece any further than in the position shown in Figure 29, the clutch collar 76 still being in driving relation to the gear 74. The cam face 111, however, has contacted with the roll 110 and has swung the free end of the lever 105 outwardly, rocking the shifter arm 61 in a direction to throw the clutch element 60a into driven engagement with the high speed gear 49. This causes the shaft 50 to be driven at the higher speed, the clutch element 60b being over-run by the mating clutch element on the low speed gear 52. Thus the turret saddle is now being moved away from the headstock at the higher of the two speeds produced by the rotation of the high speed shaft 15. As the saddle moves in this direction and approaches its outer limit of travel, the dog 90, which moves with the saddle, passes along a fixed cam bar 120, which is shown as secured at its outer end in a cross bar 121 clamped or otherwise suitably secured across the ways 2. This cam bar 120 is provided with a pair of faces 123 and 124, defining a cam shoulder 125 between them. At the forward end of the surface 123 is a beveled cam face 126.

Assuming that the dog 90 is in the position of Figure 30, which defines the high speed retracting movement of the turret saddle, and approaches its outer limit of travel, the beveled end portion 126 of the cam bar 120 strikes the pin 91, and as the saddle continues its motion, the dog 90 is rocked to the position shown in Figure 29, permitting the abutment 101 to move the arm 61 into its low speed position illustrated in Figures 22 and 25. As the saddle continues to move away from the headstock at this reduced speed, the shoulder 125 finally reaches the pin 91 and rocks the dog 90 into the position shown in Figure 28, which is the neutral position of the parts wherein the reversing clutch collar 76 is out of driving engagement with either of the gears 73 or 74, whereupon the outward traverse of the saddle stops. By moving the control handle 86 downwardly from the neutral position, the dog 90 may be moved first into the dotted line position and then into the full line position of Figure 31. This causes the cam element 94 to be rocked in the reverse direction from its neutral position to that shown in Figures 29 and 30, and causes the clutch collar 76 to engage the gear 73, thus to drive the turret saddle toward the headstock. In the dotted line position of Figure 31, the arm 61 is in the same position shown in Figure 29, that is, in the low speed position with the clutch part 60a out of engagement with the clutch sleeve 49, so that the turret saddle is moved toward the headstock at the lower of the high speeds. On depressing the handle 86 further the parts are moved to the full line high speed position of Figure 31, wherein the cam surface 112 of the dog 90 has contacted and moved the arm 61 into the same position as that shown in Figure 30 with the clutch part 60a in engagement with the sleeve 49. The saddle is then moved at the higher of the high speeds toward the headstock. It will thus be seen that the turret saddle may be moved away from the headstock at either of two selected speeds by the rotation of the high speed shaft 15, but that adjacent to its outer limit of motion it is automatically thrown into low speed in case it is not already in such speed, and that after it is thrown into such low speed, it is automatically stopped. On the forward drive of the turret saddle, that is, toward the headstock, it is moved by the rotation of the shaft 15 at either selected of two high speeds.

In Figure 32 a slight modification of this mechanism is shown in which instead of using the cam member 94, the reverse shaft arm 81 is provided with an upstanding pin 130, which extends between a pair of spring pressed abutments 131 and 132, mounted in sockets in the dog 90a. This dog 90a has cam surfaces 111a and 112a which act on the roller 110 of the arm 105 in the same manner that the corresponding surfaces 111 and 112 of the dog 90 may act thereon as shown in Figures 26 to 29, inclusive.

This high speed forward motion of the turret saddle derived from the shaft 15, and independent of the spindle speed, is provided in order that the turret tools may be brought up quickly toward the work, the lower of these being used when near to the work, whereupon further motion of the turret saddle in this direction is produced, not by the high speed drive shaft 15, but by the low speed or feed drive which will now be described.

*Saddle traversing mechanism—Low speed*

As shown best in Figure 23, the low speed drive may be taken from the spindle 4. As shown in this figure, the spindle 4 may have secured thereon a relatively small gear 150 which meshes with a gear 160 journaled on a stub shaft 161. Fixed to this gear 160 is a pinion 162 which meshes with a gear 163 journaled on a shaft 164. This gear 163 meshes with a gear 165 shown as keyed to a shaft 166 and this gear 165 meshes with a pinion 167 keyed to a sleeve 168. This sleeve is journaled on a reduced extremity 169 of a low speed drive shaft 170, and is clamped against a shoulder 171 on this shaft by a clamping bolt 172 threaded into its end and engaging a disk 173 extending over the end of a sleeve 168. This permits ready disassembly of the shaft through axial motion thereof to the right when desired. This low speed drive shaft 170 extends along the machine on its forward face and its opposite end is journaled in a suitable bearing bracket 175 at the opposite end of the machine (Figure 2). The shaft 170 is slidably but non-rotatably connected as by a key to a sleeve 175a, which is rotatably mounted, but axially fixed, in a gear casing 176 forming part of the front apron of the turret saddle 10. This sleeve 175a has a pinion portion 177 meshing with a gear 178 keyed to a shaft 179. This shaft also carries a small gear 180. With the gears 178 and 180 may be brought into mesh selectively a pinion 181 or a gear 182, respectively, which are carried by a sleeve 183 slidable on a splined shaft 184. This splined shaft 184 also carries slidable thereon a sleeve 185 carrying three gears of different sizes 186, 187 and 188, which may be brought selectively into mesh with gears 189, 190 and 191, respectively, carried by a shaft 192. Thus the shaft 192 may be driven selectively at any one of six speeds from the rotation of the low speed drive shaft 170. These slidable gear-carrying sleeves may be actuated in any suitable manner not material to this invention to select the desired speed. The shaft 192 carries a worm 193 which meshes with a worm gear 194 journaled on a shaft 195 (see Figures 12, 23 and 24). A thrust ball bearing 195a is interposed between the hub 196 of the worm gear 194 and a disk 197 bearing against a bearing 198 of the casing 41, and positioned within this hub portion is a series of pins 200 pressed axially of the shaft 195 and away from the bearing 198, as by means of springs 201. The outer ends of these pins 200 bear against a clutch element 202 slidably journaled on the shaft 195 and normally hold this element 202 out of clutching engagement with a clutch face 203 on the hub member 196. The clutch member 202 is provided with a gear 205, which meshes with a gear 206 (see Figure 24), carried by a shaft 207. This shaft extends through the inner wall of the gear box 176, and has a pinion 208 fixed thereto which meshes with a rack bar 210 (see Figures 4 and 12) secured beneath the forward way 2. Mounted on the shaft 195 on the outer face of the gear box 176 is an arm 212, which has a hub portion 213 bored out to receive a member 2130 through which are a pair of holes 214 arranged diametrically opposite to each other about the shaft 195 and in which ride pins 215, the inner ends of which bear against a hardened washer 216, which, in turn, bears against the outer race member 217 of a thrust ball bearing 218, the inner race member 219 of which engages against the outer face of the clutch member 202. Outwardly of the hub portion 213 is arranged a cap member 220, shown detached in Figure 14, and which is secured to the hub portion 213 as by means of a pin 221, extending through mating holes in the member 220 and the hub 213. This cap member 220 is shown as provided with an annular portion 225, provided with a pair of oppositely disposed notches 226, each having an inclined face 227. Between the outer ends of the pins 215 and this portion 225, is positioned a pair of balls 228, which ride against the end face of the portion 225. When the notches 226 are in registry with these balls, the springs 201, pushing against the clutch element 202, cause these balls to ride into the notches 226, and the clutch element 202 is then out of clutching engagement with the hub 196, so that any motion imparted to the worm gear 194 is not communicated to the gear 205, and is therefore ineffective to rotate the pinion 208 and move the saddle through the engagement of this pinion 208 with the rack bar 210.

When the arm 212 is in the position shown in Figures 2 and 12, being raised, the balls 228 are partly out of the notches 226 on the inclined faces 227, and the clutch element 202 is in driven relation to the worm gear hub 196, and during the normal working traverse of the saddle, the handle 212 is in this position where it is held by a latch mechanism, also shown best in Figure 12. This latch mechanism comprises a latch pin 230, which, in latching position, is pressed by a spring 231 into the outer end of an opening 232 in a plug 233, suitably secured, as by threading into a portion of the saddle 10. The outer end of the latch pin 230 is shown as carrying a transverse pin 235 which passes through a slot in the end of the sleeve 236 within which the latch pin 230 is axially movable, and into a ring 237. This ring 237 is shown detached in Figure 13 and has on its inner face a pair of cut-out portions 240 each with an inclined side face. Riding against the inner face of the ring 237 are plug members 241 secured in sockets in the outer jaw member 242 of a handle member 243. The sleeve member 236 passes through these jaws so that the handle member 243 is pivoted thereon. The handle member 243 is so disposed as to have a limited rocking motion on the sleeve 236, and in one angular position where the plugs 241 engage in the cut-out portions 240, the latch pin 230 is permitted to project into the opening 232 and hold the lever 212 in its operative condition in which it holds the clutch 202 in clutching engagement with the hub 196. The handle 243 is normally held in this position as by means of a spring pressed plug 250 bearing against a portion 251 of the handle 243 (Figure 15), but it can be rocked in opposition to this plug 250 in a direction for the plugs 241 to ride up out of the cut-out portions 240, thus to retract the spring pin 230 and to permit the handle lever 212 to drop, allowing the clutch 202 to be disconnected from the driving hub 196. The bearing of the balls on the inclined faces 227 causes the springs 201 to assist in throwing the arm 212 down quickly, releasing the clutch, as soon as the latch pin 230 is retracted.

It is desirable that the working feed of the saddle be automatically stopped when the turret saddle reaches the desired proximity to the headstock. This is done by projecting against the latch pin 230 an ejector pin 255, slidable in the opening 232, and normally held retracted as by the spring 256. It has a head 257 on its inner end, however, which may be contacted by one arm of a bell crank lever 258, the other arm of this bell crank lever 258 (see Figure 5) being engaged by a release bar 260, which is slidably mounted for endwise movement.

As shown best in Figure 20, the rear portion of the bar 260 is partly cut away as at 261, forming a shoulder 262, which is engaged by a flat face 263 of a rock shaft 264. This rock shaft extends laterally of the saddle and is provided with a cut-out portion 265 somewhat inwardly of its rear end, this cut-out portion forming a flat face 266 of considerable length. Riding in this cut-out portion 266 (shown best in Figures 10 and 19), is a series of drop fingers 270, 270a, each having its lower end portion rockingly engaging a rounded edge portion 271 of a fixed abutment member 272, and positioned directly above a control bar 273 or 273a. Each of these bars 273, 273a has a cut-out portion 274 in its upper face, the forward edge 275 of which is positioned at a point corresponding to the inner limit of motion desired for one of the tools of the turret. There is one of these bars 273 for each indexed position of the turret, and as shown in Figures 16 and 17, the additional bars 273a may be provided, for a purpose which will later appear. As shown, there are six turret positions, six bars 273 and three bars 273a, and nine drop fingers. Six of these drop fingers 270, corresponding to the number of indexed positions of the turret and over the six bars 273, are provided with slots such as at 276 in their forward edges with each of which may be engaged a portion 277 of a latch finger 278. These latch fingers are journaled on a transverse shaft 279 and are freely rockable with relation to each other. Each one has bearing on an extension 280, a plug 281 pressed upwardly by a spring 282 as far as permitted by a rotatable selector shaft 285 against which the upper faces of the extensions 278 bear. This shaft 285 is provided with a series of cut-out portions 286, one for each of the latch fingers 278, and positioned in different angular relations for the several latch fingers, as shown there being six of these cut-out portions spaced equally angularly about the axis of the shaft 285. This shaft 285 extends toward the back of the machine and on its rear end has fixed thereto a bevel gear 290 (see Figures 5 and 17). This bevel gear 290 meshes with a similar bevel gear 291 fixed to a shaft 292 which extends parallel to the ways 2 and is journaled at opposite ends in the bearings 293 and 294. Adjacent to the bearing 294 it carries a bevel gear 295, which meshes with a bevel pinion 296, carried by a shaft 297 (see Figures 5 and 12). The inner end of the shaft 297 has fixed thereto a bevel pinion 298 which meshes with a bevel gear portion 299 at the lower end of a sleeve 300 surrounding a coolant supply pipe 301 and which forms part of the rotatable turret having the base member 11. Thus as the turret is rotated from one to a succeeding indexed position, the shaft 297 is rotated, and through its connections, the shaft 292 and the selector shaft 285 are rotated, the selector shaft being rotated, when a six-position turret is employed, one-sixth of a revolution during each indexing movement, so as to present successively each of its cut-out portions 286 above the corresponding latch finger in the several indexed positions. The bars 273 are all secured together as to an anchor member 310 at their rear ends so that they are held rigidly stationary. As the turret saddle moves forward toward the headstock, when that latch finger 278 which is beneath the cut-out 286 of the selector shaft 285 corresponding to that indexed position, is allowed to drop by the corresponding drop finger 270 reaching a cut-out 274 in its bar 273, this finger 270 drops, and when the forward end 275 of the cut-out strikes against its forward face, it is rocked into the dotted line position shown in Figure 10, bringing its top face in the cut-out portion 266 of the rock shaft 264 against the base of this cut-out, and rocking the shaft 264 sufficiently to press the latch release rod 260 forwardly, rocking the bell crank lever 258 and releasing the lever 212. Dropping of this lever allows the clutch element 202 to become disconnected from the worm gear 194, so that the feed of the turret saddle toward the headstock ceases. The rear end of each cut-out 274 is beveled, so that the drop fingers 270 are returned to their raised positions on the retraction of the saddle.

Should it be desired at any time to change the forward limit of motion from that normally fixed by its control bar 273, this may be done by means for holding such drop fingers as it may be desired to hold inoperative from dropping, and placing the control in any selected of the additional bars 273a. For this purpose each of the drop fingers 270 may be provided with an extension 320 which projects over a manually controlled turnable shaft 321, which is shown best in Figures 5 to 10 and 19. This shaft 321 may be provided with a hand-actuated knob 322 on its forward end, having an indicator 323 showing its operative angular position and with which may cooperate a fixed pointer finger 324. The shaft 321 may be held in any selected angular position by a latch means, such as a spring pressed ball 325, which may be engaged in any selected of a plurality of depressions 326 therein. This shaft 321 is shown as provided with a long cut-out portion 327 which extends across all of the drop fingers 270 so that when this cut-out portion is upwardly presented, each drop finger 270 may drop freely whenever its corresponding latch finger 278 is released by the selector shaft 285 and it is brought over a cut-out 274 of its bar 273. There are, however, other cut-out portions in the shaft 321 disposed in angular relation to each other and positioned opposite to additional drop fingers 270a by which any selected one of these drop fingers may be permitted to fall whenever the lower end of such drop finger reaches a slot 274 in its controlling bar 273a. These additional drop fingers are not provided with the latch fingers 278, and so are not under the control of the selector shaft 285 which is automatically turned in response to the turret indexing. The action, however, is the same as to the stopping of the traverse of the saddle toward the headstock, the control being in accordance with the positions of the cut-outs 274 of any selected additional bar 273a.

*Saddle traversing mechanism—Hand actuated*

It is also possible to move the saddle either toward or from the headstock by hand. For this purpose a hand wheel 350 may be employed. This hand wheel is secured to a shaft 351 journaled in a post 352 projecting forwardly from the front apron of the saddle. This shaft 351, inside of this apron, carries a clutch element 3520 with which may be engaged a matching clutch element 353 on a sleeve 354 (see Figures 20, 21 and 24). The sleeve 354 carries a gear 355, which is normally in mesh with a gear 206 on the shaft 207, by the rotation of which the rack pinion 208 may be rotated to effect traverse of the saddle from the forward rack bar 210. It is desirable, however, when the power feed is in operation from the high speed drive shaft 15, that this wheel 350 be disconnected in order that the operator may conveniently actuate the handle 86 and to avoid possibility of causing injury to him because of the rotation of this wheel. The sleeve 354 which carries the gear 355 is therefore slidable on the shaft 351, and is journaled thereon, and is provided with a peripheral groove 356 within which ride shift arms 357 and 358, both journaled on the shaft 359. The arm 357 forms part of a bell crank lever having an arm 360 provided with a cam roll 361 with which cooperates a cam 362 fixed to the shaft 85. This cam 362 has a V-shaped cam surface 363 which acts on the roll 361 to rock the arm 360 and the arm 357, so as to disconnect the clutch elements 3520 and 353 without completely disengaging the gears 206 and 355, this cam 362 being so arranged that the clutch elements are separated whenever the handle 86 is in any of its driving positions and permitting the clutch elements to be closed only when the handle 86 is in neutral position, which is when the high speed drive shaft 15 is inoperative to move the saddle. The portion 360 has an abutment 365 against which presses a spring pressed plug 366 (see Figure 5), which holds the cam follower roll 361 against the cam 362 and holds the gear 355 in full mesh with the gear 206 and the clutch elements engaged whenever the handle 86 is in neutral position.

*Turret indexing, locking and clamping mechanism*

Secured as by a key to the lower face of the turret base member 11 is a disk 400 (see Figures 5, 10, 11 and 12), this disk being provided with peripheral notches as 401, corresponding in number and position to the various indexed stations of the turret. As shown the turret has six such stations so that the disk 400 has six notches 401. Cooperating with these notches in each indexed position is a cam follower 402 (see Figures 6, 7, 8 and 10) carried at the upper end of an arm 403. This arm 403 extends outwardly from a sleeve 404 which is journaled on a pivot pin 405. The sleeve 404 also is provided with an outwardly extending arm 406, which is normally pressed upwardly by a spring mechanism at 408 so as to press the follower 402 into the notches 401 of the disk 400 as they are brought in turn into aline-
ment therewith by the indexing of the turret.
This spring mechanism, as shown best in Figures
10 and 10a, comprises a hollow post 409 forming
a turret locking pin and slidable within a sleeve
410 and pressed upwardly by a spring 411. The
arm 406 extends through a slot 412 in the sleeve
410 and engages in an opening 413 in the post 409
so that movement of the post rocks the sleeve
404. The upper end of the post 409 may enter
correspondingly shaped recesses 414 in the under
face of the base 11 and the upper face of the
post may have a transverse rib 415 which may
snap into a corresponding recess 416 in the lower
face of a hardened disk 417 seated in each recess
414. The follower 402 holds the pin out of con-
tact with the turret until the indexed position is
reached so that the post 409 is relieved of un-
necessary wear and the accuracy of its locking
function is maintained.

The sleeve 404 is also provided with an arm 420
carrying a cam follower 421 at its free end by
which the sleeve 404 may be rocked in a direc-
tion to withdraw the locking pin or post 409 from
a recess 414 when it is desired to index the turret.
For so actuating this arm 420 a cam 422 (Figures
6 to 9) is employed, this cam being formed as a
block projecting from one face of an elongated
plate 423. This plate rests against a beveled
upper face 424 of a block 425, which is secured
to a bar 426. This bar may have a reduced ex-
tremity 427 which passes through a hole 426a in
the block 425, and a nut 428, threaded on a por-
tion 429 inwardly of the reduced portion 427,
may be used to secure the block 425 against a
shoulder portion of the bar 426. This block 425
is also slidably supported on a guide bar 430,
which is supported at opposite ends in frame por-
tions of the turret saddle as is illustrated in Fig-
ure 11. The bar 426, as shown best in Figure 11,
is provided at its rear end with a recess 435 in
which is pivotally mounted a hook 436 normally
pressed by a spring pressed plug 437 so as to hold
its hooked extremity 438 raised so as to snap into
engagement with an oppositely directed hook 440
(see Figures 1, 2 and 3) rigidly fixed to the mem-
ber 121 when the saddle approaches its limit of
retracted motion. The hook 438 has a beveled
latch face 441, which cooperates with the hook
440 to depress the hook 438 to permit it to pass to
latching position when the turret saddle is moved
to its extreme retracted position. The turret
saddle goes back sufficiently far, however, so that
this hook 440 engages the rear end of the bar 426
and forces this bar forwardly from the position
shown in Figure 6 to the position shown in Figure
7, during which movement the cam block 422 has
passed in under the cam follower 421 and rocked
the sleeve 404 to retract the locking pin 409 and
has then permitted the follower 402 to snap back
against the edge of the disk 400, which has then
been turned somewhat by the indexing of the
turret, as will later appear, so that the members
402 and 409 are in position to snap back into the
succeeding locking notch 401 and recess 414, re-
spectively, when the turret reaches its next in-
dexed position.

The indexing of the turret is accomplished by
movement of the bar 426. To this end the block
425 has pivoted thereto, as at 445, an indexing
pawl 446, which engages between teeth 447 of a
member 448 positioned beneath the disk 400 on
the hub portion 450 of the turret base member
11 and suitably secured as by being keyed there-
to. In the position of the bar 426 shown in Fig-
ure 6, the indexing pawl 446 is out of contact with
the teeth 447, but as the bar 426 is moved for-
wardly by impingement of its rear end against
the hook 440, it contacts with one of the teeth
447 after the locking pin 409 has been rocked
out of locking position, and further movement of
the bar 426 causes this pawl to index the member
448 the space of one tooth, thus to index the
turret. The pawl is prevented from backward
rocking during this motion by the engagement of
a portion 449 thereon against an abutment 450
carried by the block 425. The turret is thus un-
locked and indexed during the last portion of the
retractive motion of the turret saddle. During
this motion, also, means for clamping the turret
firmly to the saddle about the periphery of the
turret base 11, in order to prevent tilting of the
turret during operation of the turret tools, is re-
leased. This clamping means comprises a two-
part clamping ring having the semi-annular parts
460 and 461 which have on their inner faces a V-
shaped groove 462, which cooperates with circu-
lar beveled adjacent peripheral faces 463 and 464
on the turret base ring 11 and a supporting mem-
ber 465 of the turret saddle. The parts 460 and
461 of this clamping ring are adjustably secured
together at one end as by an adjusting screw 466.
At the opposite ends there are two links 467 piv-
oted on opposite sides of a central fin 469 on the
member 460 and there is a single link 468 having
one end inserted in a slot 470 of the brake mem-
ber 461 and there pivoted. The free ends of the
links 467 and 468 overlap, however, and their
overlapping portions are provided with triangu-
larly shaped holes 472 and 473, the holes through
the links 467 being reversely arranged to the
triangular shape of the hole in the link 468.
Through these holes extends the flattened por-
tion 470 of a pivot member 474 (Figures 6, 7, and
21) to which is secured within the turret saddle
10 a gear segment 475. This meshes with a simi-
lar gear segment 476 journaled on a pivot 477,
and this segment 476 has a lateral extension 478
terminating in an enlarged and rounded head
479. This head rides in a cam groove 480 in a
side face of the block 425. This cam groove has
a deepened end portion 481 terminating in an
end wall 482. In the arrangement of the parts
as shown in Figure 6, the position of the flattened
pivot portion 474 within the slots of the links 467
and 468 is such that it lies along short sides of
these slots 472 and 473, thus holding these links
in such overlapping relation that the band mem-
bers 460 and 461 are tightened about the faces
463 and 464 of turret base 11 and its support on
the saddle, so as to clamp these parts firmly to-
gether, and they are so held by engagement of the
head 479 against the end wall 482 of the cam
groove in which this head rides. The initial mo-
tion of the rod 426 toward the position shown in
Figure 7 inwardly after it strikes against the hook
440, causes the head 479 to ride out from the
deeper portion of the slot, and rocks the segments
476 and 475 into the position shown in Figure 7,
causing the flattened portion 474 to take an in-
clined position relative to the openings through
the links 467 and 468 and along the longer sides
of these slots, thus to release the clamping pres-
sure of the band members 460 and 461 and thus
to unclamp the turret. This unclamping action,
as well as the withdrawal of the locking pins,
takes place before the indexing pawl 446 strikes
a tooth 447 and indexes the turret.

At the extreme retracted position of the turret
saddle, when the high speed driving mechanisms
have been automatically put into neutral position, the latch hook 438 is in hooked engagement with the hook 440, and on subsequent movement of the turret forwardly or toward the headstock, the bar 426 is held back by the hook 440 so that the block 425 is drawn back from the position shown in Figure 7 toward the position shown in Figure 6. Engagement of the back face of the pawl 446 on one of the teeth 447 acts merely to rock this pawl 446 out of the way, as shown in the position, Figure 8, but this pawl is returned to operating angular position by a part 451 thereof impinging on a lug 452 (Figures 8 and 12) on the turret saddle. This motion of the block 425 causes the head 479 of the extension 478 to ride into the deepened portion 480 of its cam slot and against the closed wall 482, thus returning the clamping band to locking relation. As this occurs a release pin 485 (see Figure 11) fixed in the rear portion of the saddle contacts with the rear end of the hook 436 and rocks it upwardly, thus releasing the hook 438 from the fixed hook 440. The saddle then continues its motion toward the headstock with the block 425 in the position shown in Figure 6. Thus at each withdrawal of the turret saddle from the headstock the turret is unclamped, the locking pin withdrawn, the turret indexed, and the locking pin permitted to snap back into a succeeding locking position, while on the forward motion of the turret saddle toward the headstock, the turret is again clamped to the saddle, and the turret indexing and locking means again conditioned for actuation on a succeeding retraction of the turret saddle.

The coolant for the turret tools is arranged to be controlled automatically so that it passes only to those turret tools which are in operative indexed position at any time. The top of the coolant supply pipe 301 is closed off, as by the plug 500 threaded into its upper end (Figures 5b, 10 and 12), and below this plug it is provided with a slot 501 (Figure 5b) through its side with which register successively passages 502 extending radially in the member 11 and closed at their outer ends as by plugs 503. There is one of the passages 502 for each indexed position of the turret and in communication with each is a threaded opening such as 504 into which may be screwed pipe connections (not shown) leading to suitable points above the active positions of the tools at their respective stations. In case any of the stations is unprovided with tools the corresponding opening 504 will be closed as by a threaded plug. Thus as the tools at any station of the turret are indexed to operative position, the coolant is automatically turned on and when such tools are indexed away from operative position, their supply of coolant is automatically shut off.

From the foregoing description of an embodiment of this invention, it should be evident to those skilled in the art that various changes and modifications might be made without departing from the spirit or scope of this invention as defined by the appended claims.

We claim:

1. A lathe having a bed, a headstock on said bed, a turret saddle movable on said bed toward and from said headstock, a turret carried by said saddle, means for moving said saddle, turret-clamping means, and means actuable on movement of said saddle from said headstock to release said clamping means and then to index said turret, said lathe including means actuated by movement of said saddle toward said headstock to actuate said clamping means to clamp said turret against rotation.

2. A lathe having a bed, a headstock on said bed, a turret saddle movable on said bed toward and from said headstock, a turret carried by said saddle, means for moving said saddle, turret-locking means, turret-clamping means, and means actuable on movement of said saddle from said headstock to release said locking and clamping means and then to index and lock said turret, said lathe including means actuated by movement of said saddle toward said headstock to actuate said clamping means to clamp said turret against rotation.

3. A turret lathe comprising a bed, a headstock on said bed, a turret saddle movable on said bed toward and from said headstock, means for moving said saddle, a turret pivoted on said saddle, a turret lock, a clamp for securing said turret to said saddle, a bar movable relative to said saddle, means for moving said bar in one direction relative to said saddle as said saddle approaches the outer limit of its motion and in the opposite direction as said saddle moves inwardly for a portion of its traverse from said outer limit, means actuable on the motion of said bar in said one direction relative to said saddle to unlock said lock, unclamp said clamp, index said turret and permit said lock to relock said turret, and operative connections between said member and clamp causing motion of said member relative to said saddle in the opposite direction to re-clamp said clamp.

4. A lathe having a bed, a headstock on said bed, a tool-carrying saddle movable on said bed toward and from said headstock, power means for moving said saddle toward said headstock, a knock-off for operatively disconnecting said power-moving means from said saddle, and a member turnable by continued movement of said saddle beyond a predetermined point for actuating said knock-off.

5. A lathe having a bed, a headstock on said bed, a turret saddle movable on said bed toward and from said headstock, a turret turnable on said saddle, power means for moving said turret toward said headstock, a knock-off for operatively disconnecting said power-moving means from said saddle, a plurality of members, means determined by the indexed angular position of said turret selecting one of said members, means actuable by continued movement of said saddle beyond a predetermined point to turn the selected member, and means actuable by the turning of said selected member to actuate said knock-off.

6. A lathe having a bed, a headstock on said bed, a turret saddle movable on said bed toward and from said headstock, a turret turnable on said saddle, power means for moving said turret toward said headstock, a knock-off for operatively disconnecting said power-moving means from said saddle, a plurality of members, means determined by the indexed angular position of said turret selecting one of said members, means actuable by continued movement of said saddle beyond a predetermined point to turn the selected member, means actuable by the turning of said selected member to actuate said knock-off, and means for predetermining said point independently for each selected member.

7. A lathe having a bed, a headstock on said bed, a turret saddle movable on said bed toward and from said headstock, a turret carried by said saddle and turnable about an axis thereon, and a tubular member extending to said turret from said saddle in the turret axis for delivering coolant to said turret.

8. In a lathe, a bed, a headstock, a rotary spindle in said headstock, a carriage movable on said bed from and toward said headstock, and means selectively actuable to move said carriage toward said headstock at a relatively fast idle speed independent of the speed of rotation of said spindle or at a relatively slow working speed and to move said carriage away from said headstock at either of two different speeds independent of the speed of rotation of said spindle.

9. In a lathe, a bed, a headstock, a rotary spindle in said headstock, a carriage movable on said bed from and toward said headstock, means selectively actuable to move said carriage toward said headstock at a relatively fast idle speed independent of the speed of rotation of said spindle or at a relatively slow working speed and to move said carriage away from said headstock at either of two different speeds independent of the speed of rotation of said spindle, and means automatically stopping the movement of said carriage at desired limits.

10. In a lathe, a bed, a headstock, a carriage movable on said bed from and toward said headstock, means selectively actuable to move said carriage toward said headstock at a relatively fast idle speed or at a relatively slow working speed and to move said carriage away from said headstock at either of two different speeds, means automatically stopping the movement of said carriage at desired limits, and means insuring the selection of the lower of said two speeds adjacent to the stopping limit remote from said headstock.

11. In a lathe, a bed, a headstock, a rotary spindle in said headstock, a carriage movable on said bed from and toward said headstock, power-moving means, and means selectively actuable to effect movement of said carriage away from said turret by said power-moving means at either of two speeds independent of the speed of rotation of said spindle.

12. In a lathe, a bed, a headstock, a rotary spindle in said headstock, a carriage movable on said bed from and toward said headstock, power-moving means, and means selectively actuable to effect movement of said carriage toward or away from said turret by said power-moving means at either of two speeds independent of the speed of rotation of said spindle.

13. In a lathe, a bed, a headstock, a carriage movable on said bed from and toward said headstock, power-moving means, means selectively actuable to effect movement of said carriage away from said turret by said power-moving means at either of two speeds, and means insuring movement of said carriage at the lower of said two speeds as it approaches its outer limit of motion and then stopping such movement.

14. In a lathe, a bed, a headstock, a rotary spindle in said headstock, a carriage movable on said bed from and toward said headstock, and means selectively actuable to move said carriage toward said headstock at a relatively fast idle speed independent of the speed of rotation of said spindle or at any selected of a plurality of slow working speeds with a correlative spindle speed and to move said carriage away from said headstock at either of two different speeds independent of said spindle speed.

15. In a lathe, a bed, a headstock, a carriage movable on said bed toward and from said headstock, means for moving said carriage including a rotary shaft extending along said bed, means for rotating said shaft, selective speed and reversing connections between said shaft, carriage and bed, operator-actuable means for selecting the direction and speed of such traverse, and means for automatically selecting a speed less than the maximum for one direction adjacent to the limit of motion of said carriage in said direction.

16. A lathe having a bed, a headstock on said bed, a tool carriage movable on said bed from and toward said headstock, a high speed drive, a low speed drive, means for coupling said high speed drive to move said carriage selectively toward or from said headstock, and means for coupling said low speed drive to move said carriage in the direction only toward said headstock.

17. A lathe having a bed, a headstock on said bed, a tool carriage movable on said bed from and toward said headstock, a high speed drive, a low speed drive, means for coupling said high speed drive to move said carriage selectively toward or from said headstock, and means for coupling said low speed drive to move said carriage in the direction only toward said headstock and at any of a plurality of selected speeds.

18. A lathe having a bed, a headstock on said bed, a tool carriage movable on said bed from and toward said headstock, a high speed drive, a low speed drive, means for coupling said high speed drive to move said carriage selectively toward or from said headstock at either of a pair of speeds, and means for coupling said low speed drive to move said carriage in the direction only toward said headstock.

19. A lathe having a bed, a headstock on said bed, a tool carriage movable on said bed from and toward said headstock, a high speed drive, a low speed drive, means for coupling said high speed drive to move said carriage selectively toward or from said headstock at either of a pair of speeds, means for coupling said low speed drive to move said carriage in the direction only toward said headstock, and automatically acting means insuring the selection of the lower of said pair of speeds from said high speed drive as said carriage approaches the outer limit of its movement.

20. A lathe having a bed, a headstock on said bed, a carriage movable on said bed from and toward said headstock, a spindle journaled in said headstock, means for driving said spindle, means driven in time with said spindle for selectively moving said carriage toward said headstock at a low working speed, a high speed drive independent from said spindle speed, and means for selectively operatively connecting said high speed drive to move said carriage either toward or from said headstock.

21. A lathe having a bed, a headstock on said bed, a carriage movable on said bed from and toward said headstock, a spindle journaled in said headstock, means for driving said spindle, means driven in time with said spindle for selectively moving said carriage toward said headstock at a low working speed, a high speed drive independent from said spindle speed, and means for selectively operatively connecting said high speed drive to move said carriage either toward or from said headstock and at any of a plurality of selected speeds.

22. A lathe having a bed, a headstock on said bed, a carriage movable on said bed from and toward said headstock, a spindle journaled in said headstock, means for driving said spindle, means driven in time with said spindle for selectively moving said carriage toward said headstock at a low working speed, a high speed drive independent from said spindle speed, means for selectively operatively connecting said high speed drive to move said carriage either toward or from said headstock at any of a plurality of selected speeds, and means automatically selecting the slowest of said selected speeds when said carriage approaches its outer limit of traverse.

23. In a lathe, a bed, a headstock on said bed, a carriage movable on said bed toward and from said headstock, means for producing a motion of said carriage at any selected of a plurality of speeds, and means automatically insuring a speed lower than the highest speed as said carriage approaches one limit of its motion.

24. In a lathe, a bed, a headstock on said bed, a carriage movable on said bed toward and from said headstock, means for producing a motion of said carriage at either selected of two speeds, and means effective on the motion in one direction as said carriage approaches its limit of motion to insure the selection of the lower of said two speeds.

25. The combination in a turret lathe having a bed, a headstock, a turret saddle movable on said bed toward and from said headstock, a turret carried by said saddle, means for moving said saddle, and means for indexing said turret, of a plurality of stop devices operative to limit the movement of said saddle, a rotary selector shaft, means actuated in time with the indexing of said turret for turning said shaft through successive angular distances, and means controlled by the angular position of said shaft determining which of said devices is operative.

26. The combination in a turret lathe having a bed, a headstock, a turret saddle movable on said bed toward and from said headstock, a turret carried by said saddle, means for moving said saddle, and means for indexing said turret, of a plurality of stop devices operative to limit the movement of said saddle, a rotary selector shaft, means actuated in time with the indexing of said turret for turning said shaft through successive angular distances, means controlled by the angular position of said shaft determining which of said devices is operative, and manually actuable means for rendering said selector shaft inoperative.

27. The combination in a turret lathe having a bed, a headstock, a turret saddle movable on said bed toward and from said headstock, a turret carried by said saddle, means for moving said saddle, and means for indexing said turret, of a plurality of stop devices operative to limit the movement of said saddle, a rotary selector shaft, means actuated in time with the indexing of said turret for turning said shaft through successive angular distances, means controlled by the angular position of said shaft determining which of said devices is operative, and manually actuable means for rendering said selector shaft inoperative and itself controlling a limit of motion of said saddle.

28. The combination in a turret lathe having a bed, a headstock, a turret saddle movable on said bed toward and from said headstock, a turret carried by said saddle, means for moving said saddle, and means for indexing said turret, of a plurality of fixed stop elements, a finger for each stop element carried by said saddle, a rotary selector shaft having a flat portion corresponding to each finger, said flat portions being arranged at different angular positions about the axis of said selector shaft, means holding each finger elevated from cooperating relation to its stop except when the corresponding flat is in a predetermined angular position, means for turning said shaft on indexing of said turret to present said flats successively into said angular position, and means actuated by contact of any of said fingers against its stop limiting a movement of said saddle.

29. The combination in a turret lathe having a bed, a headstock, a turret saddle movable on said bed toward and from said headstock, a turret carried by said saddle, means for moving said saddle, and means for indexing said turret, of a plurality of fixed stop elements more in number than the indexed positions of said turret, a finger for each stop element carried by said saddle, a rotary selector shaft having a flat portion for each indexed position of said shaft, said flat portions being arranged at different angular positions about the axis of said selector shaft, means holding each of a number of said fingers equal to the number of indexed stations elevated from cooperation with its respective stop except when a corresponding flat of said selector shaft is in a predetermined angular position, means for turning said selector shaft on indexing of said turret to present said flats successively in said angular position, a second rotatable selector shaft having angularly related flats thereon one of which when in one angular position causes said second shaft to be ineffective on said fingers controlled by said first-mentioned selector shaft, and said second shaft when in other angular positions acting to prevent dropping of all of said fingers controlled by said first-mentioned selector shaft, operative connections between the other of said fingers and said second-mentioned shaft for selectively permitting their cooperating engagement with their respective stops in accordance with the angular positions of the other flats on said second-mentioned shaft, operator-actuable means controlling the angular position of said second-mentioned shaft, and means actuated by contact of any of said fingers against its stop limiting the movement of said saddle.

JOHN E. LOVELY.
FRANK E. CHEEVER.